United States Patent
Vetrone

(10) Patent No.: US 9,904,059 B2
(45) Date of Patent: Feb. 27, 2018

(54) READING AID

(71) Applicant: Shirley Vetrone, Naples, FL (US)

(72) Inventor: Shirley Vetrone, Naples, FL (US)

(*) Notice: Subject to any disclaimer, the term of this patent is extended or adjusted under 35 U.S.C. 154(b) by 0 days.

(21) Appl. No.: 15/205,204

(22) Filed: Jul. 8, 2016

(65) Prior Publication Data
US 2018/0011328 A1  Jan. 11, 2018

(51) Int. Cl.
G02B 27/02 (2006.01)
G02B 7/04 (2006.01)

(52) U.S. Cl.
CPC ............ G02B 27/025 (2013.01); G02B 7/04 (2013.01); G02B 27/021 (2013.01); G02B 27/028 (2013.01)

(58) Field of Classification Search
CPC ........ G02B 25/00; G02B 27/02; G02B 25/02; G02B 27/12; G02B 27/025; G02B 7/04; G02B 27/021; G02B 27/028
USPC .......................................................... 359/802
See application file for complete search history.

(56) References Cited

U.S. PATENT DOCUMENTS

| | | | | |
|---|---|---|---|---|
| 3,945,717 A * | 3/1976 | Ryder | ..................... | G02B 25/02 359/800 |
| 4,099,851 A * | 7/1978 | Rethore | ............... | G02B 25/007 359/647 |
| D298,634 S * | 11/1988 | Yuen | ............................ | D16/135 |
| 4,923,282 A * | 5/1990 | Spitzberg | ............. | G02B 25/007 359/737 |
| 5,021,933 A * | 6/1991 | Cordes | ................... | G02B 25/02 359/802 |
| 5,028,127 A * | 7/1991 | Spitzberg | ............... | G02B 7/002 351/158 |
| 5,283,698 A * | 2/1994 | Fukuzawa | .......... | H04N 1/00002 355/55 |
| 5,471,347 A | 11/1995 | Galiani | | |
| 5,639,156 A | 6/1997 | Broxson | | |
| 5,694,256 A * | 12/1997 | Winkler | ............... | G02B 25/002 359/803 |
| 5,734,154 A * | 3/1998 | Jachimowicz | ... | G06K 19/07703 235/454 |
| 5,943,173 A * | 8/1999 | Waterhouse | .......... | G02B 25/02 359/802 |
| 5,956,616 A | 9/1999 | Mizuno et al. | | |
| 6,055,115 A * | 4/2000 | Davis | ..................... | G02B 25/02 359/800 |
| 6,384,988 B1 * | 5/2002 | Muller | ................... | G02B 25/02 359/798 |
| 6,574,051 B1 * | 6/2003 | Powell | ................. | G02B 25/002 359/802 |
| 6,951,403 B2 * | 10/2005 | Bennett, Jr. | ............ | B42D 3/123 359/802 |

(Continued)

FOREIGN PATENT DOCUMENTS

WO    WO2010141707    12/2010

Primary Examiner — James Greece

(57) ABSTRACT

A reading aid for magnifying text includes a first frame. The first frame comprises an annular wall that extends from a top to a bottom. The bottom is open. A first lens is positioned in the top. A second lens is adjustably coupled to an interior of the annular wall. The second lens is parallel planarly positioned relative to the first lens. A power module is coupled to the first frame. A plurality of lights is coupled to an upper end of the first frame. The lights are operationally coupled to the power module. The second lens is adjustably positionable relative to the first lens to obtain a magnification level required by a user. The lights are configured to illuminate a printed item positioned beneath the first frame such that the printed item is readable by the user.

13 Claims, 4 Drawing Sheets

(56) References Cited

U.S. PATENT DOCUMENTS

| | | | |
|---|---|---|---|
| D535,675 S | 1/2007 | Longchamp | |
| 7,224,494 B2 * | 5/2007 | Saitou | H04N 1/02815 |
| | | | 358/474 |
| 7,304,809 B1 * | 12/2007 | Budacz | G02B 6/001 |
| | | | 359/802 |
| 7,538,916 B2 * | 5/2009 | Tatsuno | G02B 19/0066 |
| | | | 358/475 |
| 7,558,009 B1 * | 7/2009 | Faires | G02B 27/025 |
| | | | 359/802 |
| 7,616,390 B1 * | 11/2009 | Cosby | A47B 23/042 |
| | | | 248/441.1 |
| 7,813,060 B1 | 10/2010 | Bright et al. | |
| 8,254,598 B2 | 8/2012 | Holzman | |
| D669,512 S * | 10/2012 | Besse | D16/135 |
| 8,335,044 B1 * | 12/2012 | Besse | G02B 25/02 |
| | | | 359/803 |
| 8,416,513 B1 * | 4/2013 | McPherson | G02B 25/002 |
| | | | 248/444 |
| 2002/0097507 A1 * | 7/2002 | Uriarte | G02B 25/002 |
| | | | 359/802 |
| 2005/0036191 A1 * | 2/2005 | Schuttinger | G02B 25/02 |
| | | | 359/246 |
| 2007/0236813 A1 | 10/2007 | Josephnerg et al. | |
| 2007/0273987 A1 * | 11/2007 | Cintz | G02B 25/005 |
| | | | 359/813 |
| 2010/0067125 A1 * | 3/2010 | Schuttinger | G02B 25/002 |
| | | | 359/803 |
| 2011/0216418 A1 * | 9/2011 | Shiraishi | G02B 27/12 |
| | | | 359/619 |

* cited by examiner

READING AID

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to reading aids and more particularly pertains to a new reading aid for magnifying text.

BRIEF SUMMARY OF THE INVENTION

An embodiment of the disclosure meets the needs presented above by generally comprising a first frame. The first frame comprises an annular wall that extends from a top to a bottom. The bottom is open. A first lens is positioned in the top. A second lens is adjustably coupled to an interior of the annular wall. The second lens is parallel planarly positioned relative to the first lens. A power module is coupled to the first frame. A plurality of lights is coupled to an upper end of the first frame. The lights are operationally coupled to the power module. The second lens is adjustably positionable relative to the first lens to obtain a magnification level required by a user. The lights are configured to illuminate a printed item positioned beneath the first frame such that the printed item is readable by the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
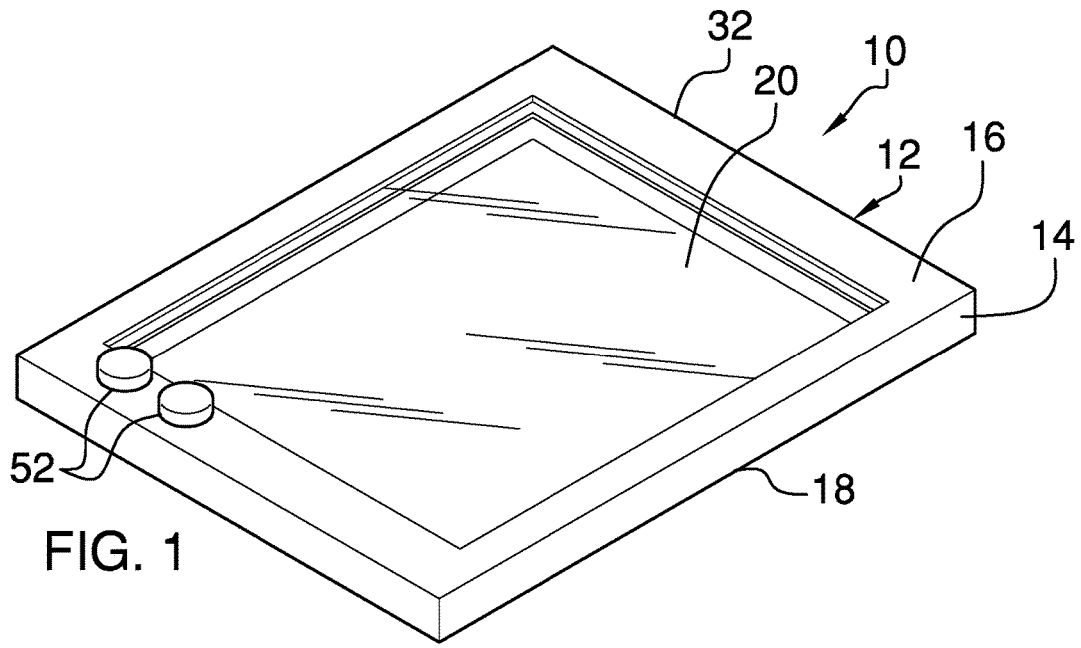
FIG. 1 is an isometric perspective view of a reading aid according to an embodiment of the disclosure.
Figure 2:
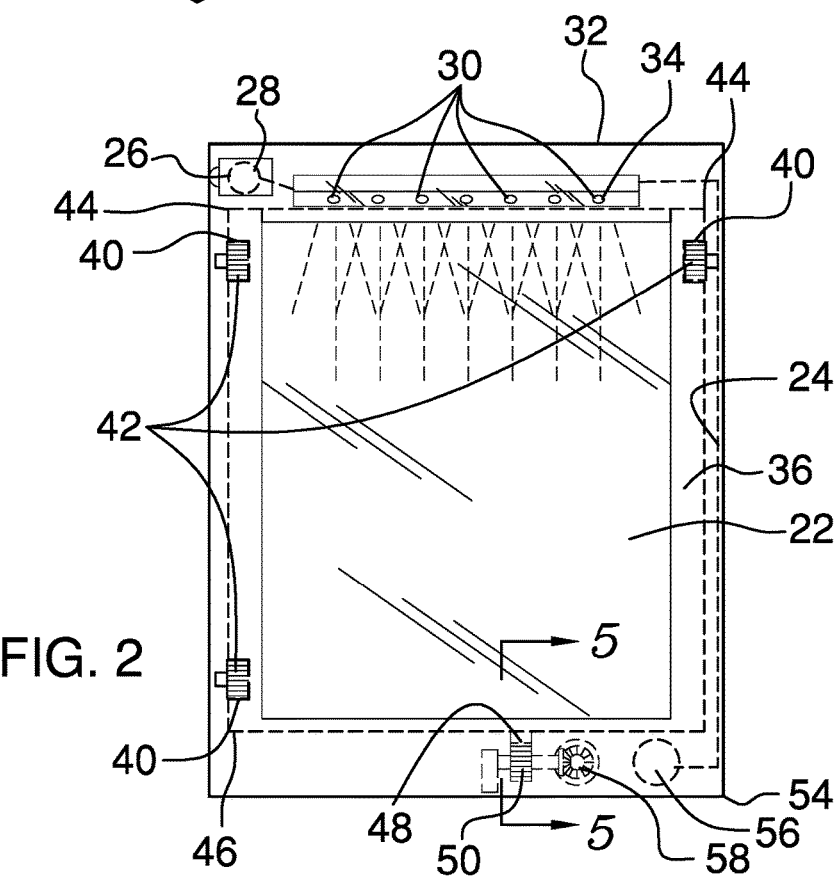
FIG. 2 is a top view of an embodiment of the disclosure.
Figure 3:
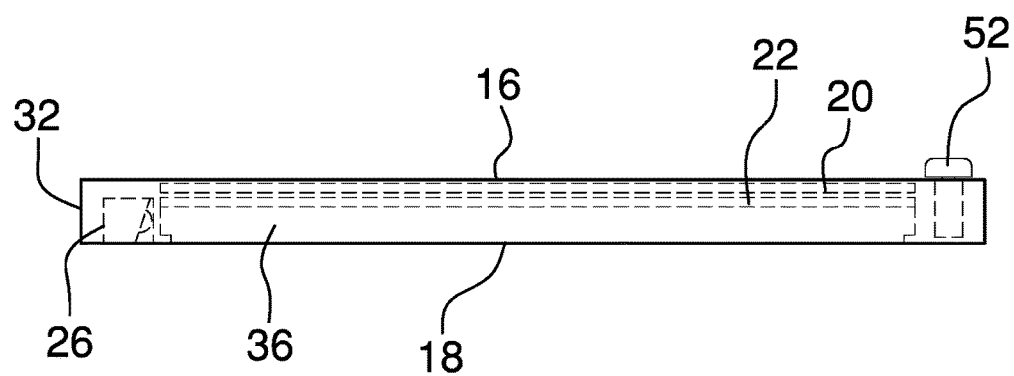
FIG. 3 is a side view of an embodiment of the disclosure.
Figure 4:
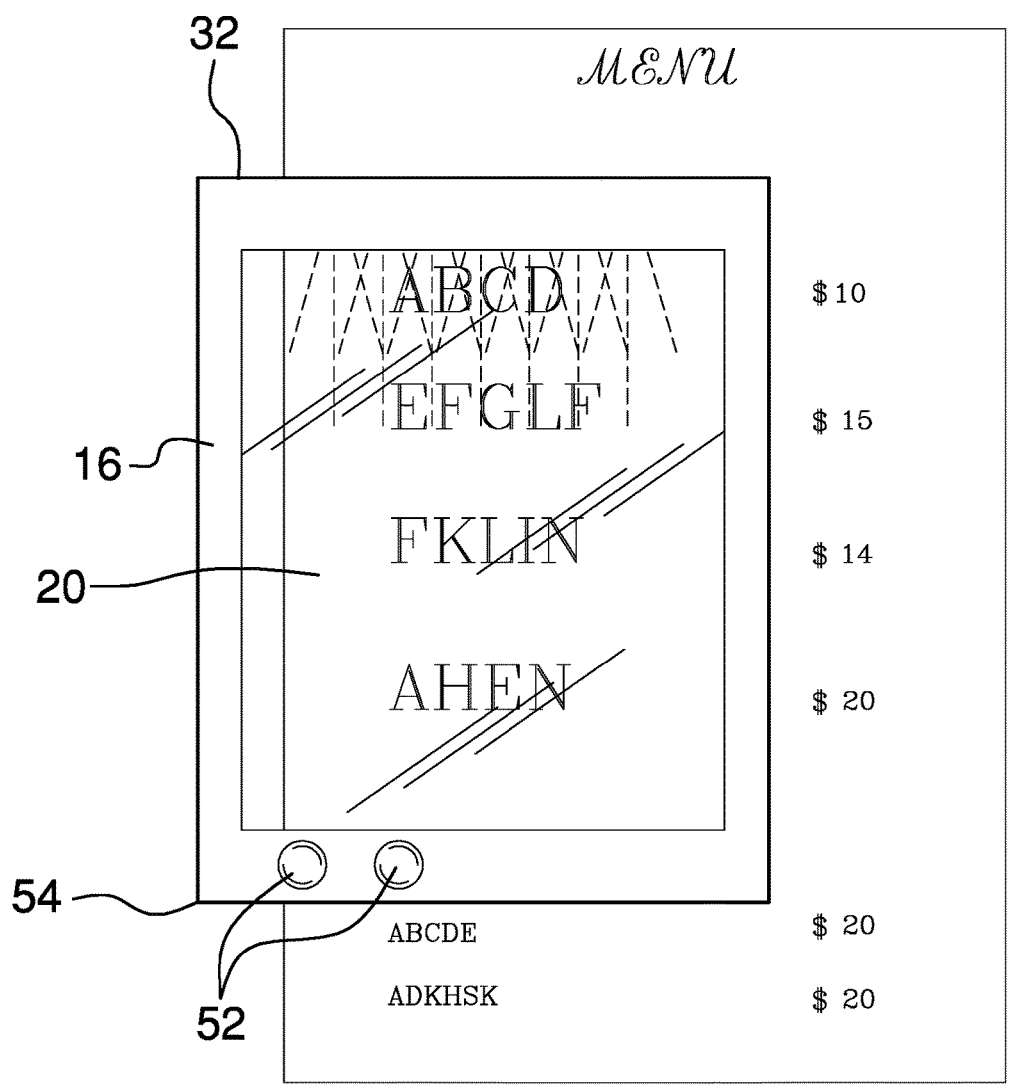
FIG. 4 is an in-use view of an embodiment of the disclosure.
Figure 5:
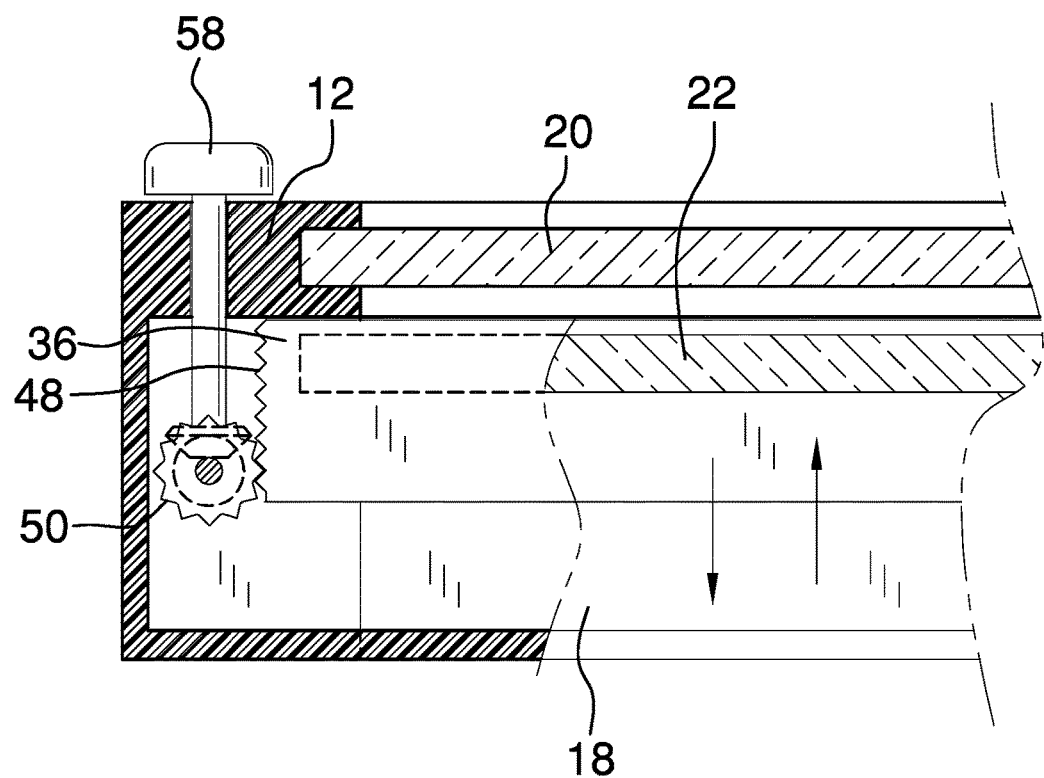
FIG. 5 is a cross-sectional view of an embodiment of the disclosure.

With reference now to the drawings, and in particular to FIGS. 1 through 5 thereof, a new reading aid embodying the principles and concepts of an embodiment of the disclosure and generally designated by the reference numeral 10 will be described.

As best illustrated in FIGS. 1 through 5, the reading aid 10 generally comprises a first frame 12. The first frame 12 comprises an annular wall 14 that extends from a top 16 to a bottom 18. The bottom 18 is open. The first frame 12 is substantially rectangularly shaped. In one embodiment, the first frame 12 is dimensioned at from twenty to thirty centimeter by ten to fifteen centimeters.

A first lens 20 is positioned in the top 16. A second lens 22 is adjustably coupled to an interior 24 of the annular wall 14. The second lens 22 is parallel planarly positioned relative to the first lens 20. The second lens 22 is adjustably positionable relative to the first lens 20 to obtain a magnification level required by a user. In one embodiment, the second lens 22 is adjustably positionable relative to the first lens 20 such that magnification levels of zero to four diopter are obtainable in increments of 0.25 diopter. In another embodiment, the second lens 22 is adjustably positionable relative to the first lens 20 such that magnification levels of one to three diopter are obtainable. In yet another embodiment, the second lens 22 is adjustably positionable relative to the first lens 20 such that magnification levels of 1.25, 1.5 and 2.25 diopter are obtainable.

A power module 26 is coupled to the first frame 12. In one embodiment, the power module 26 comprises at least on battery 28. A plurality of lights 30 is coupled to an upper end 32 of the first frame 12. The lights 30 are operationally coupled to the power module 26. The lights 30 are oriented to illuminate a printed item positioned beneath the first frame 12. In one embodiment, the lights 30 comprise light emitting diodes 34.

The aid 10 comprises a second frame 36 that is complementary to the first frame 12. The second frame 36 is positionable through the bottom 18 of the first frame 12. The second frame 36 comprises an annular sidewall 38. The annular sidewall 38 is coupled to and retains the second lens 22.

A plurality of first rack gears 40 is coupled to the annular sidewall 38 of the second frame 36. Each first rack gear 40 is gearedly coupled to a respective first pinion gear 42. In one embodiment, the plurality of first rack gears 40 comprises first rack gears 40 positioned singly proximate to upper corners 44 and a first lower corner 46 of the second frame 36. Each first pinion gear 42 is rotationally coupled to the interior 24 of the annular wall 14. The first rack gears 40 are positioned on the annular sidewall 38 and are positioned to gearedly couple to the first pinion gears 42 to stabilize the second frame 36 as the second frame 36 is adjustably positioned relative to the first frame 12.

A second rack gear 48 is coupled to the annular sidewall 38 of the second frame 36. The second rack gear 48 is gearedly coupled to a second pinion gear 50.

A control panel 52 coupled to the first frame 12. The control panel 52 is operationally coupled to the plurality of lights 30, the power module 26, and the second lens 22. The control panel 52 is positioned to couple the lights 30 to the power module 26 to illuminate the printed item. The control panel 52 also is positioned to adjust the position of the second lens 22 relative to the first lens 20. The control panel 52 is configured to adjust the magnification level to a level required by a user. In one embodiment, the control panel 52 is positioned proximate to a second lower corner 54 of the first frame 12.

In one embodiment, the control panel 52 comprises a first knob 56 and a second knob 58 that are rotationally coupled to the first frame 12. The first knob 56 is operationally coupled to the plurality of lights 30 and the power module 26. The first knob 56 is positioned to couple the lights 30 to the power module 26 to illuminate the printed item. The second knob 58 is operationally coupled to the second pinion gear 50. The second knob 58 is positioned to rotate the second pinion gear 50 such that the second rack gear 48 is compelled to move the second lens 22 relative to the first lens 20 to adjust the magnification level to the level required by the user.

In use, the first frame 12 is configured to position over a printed item that requires magnification. The second lens 22 is adjustably positionable relative to the first lens 20 to obtain a magnification level required by a user. The lights 30 are configured to illuminate the printed item positioned beneath the first frame 12 such that the printed item is readable by the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A reading aid comprising:
   a first frame, said first frame comprising an annular wall extending from a top to a bottom, said bottom being open;
   a first lens positioned in said top;
   a second lens adjustably coupled to an interior of said annular wall, said second lens being parallel planarly positioned relative to said first lens, wherein said second lens is adjustably positionable relative to said first lens to obtain a magnification level required by a user;
   a power module coupled to said first frame;
   a plurality of lights coupled to an upper end of said first frame, said lights being operationally coupled to said power module, said lights being oriented to illuminate a printed item positioned beneath said first frame;
   wherein said second lens is adjustably positionable relative to said first lens to obtain a magnification level required by a user, such that said lights are configured to illuminate a printed item positioned beneath said first frame such that the printed item is readable by the user;
   a second frame complementary to said first frame, such that said second frame is positionable through said bottom of said first frame, said second frame comprising an annular sidewall, said annular sidewall being coupled to and retaining said second lens;
   a plurality of first rack gears coupled to said annular sidewall of said second frame;
   each said first rack gear being gearedly coupled to a respective first pinion gear;
   each said first pinion gear being rotationally coupled to said interior of said annular wall;
   a second rack gear coupled to said annular sidewall of said second frame, said second rack gear being gearedly coupled to a second pinion gear; and
   wherein said first rack gears are positioned on said annular sidewall such that said first rack gears are positioned to gearedly couple to said first pinion gears to stabilize said second frame and as said second frame is adjustably positioned relative to said first frame.

2. The aid of claim 1, further including said first frame being substantially rectangularly shaped.

3. The aid of claim 1, further including said first frame being dimensioned at from twenty to thirty centimeter by ten to fifteen centimeters.

4. The aid of claim 1, further including said second lens being adjustably positionable relative to said first lens such that magnification levels of zero to four diopter are obtainable in increments of 0.25 diopter.

5. The aid of claim 4, further including said second lens being adjustably positionable relative to said first lens such that magnification levels of one to three diopter are obtainable.

6. The aid of claim 5, further including said second lens being adjustably positionable relative to said first lens such that magnification levels of 1.25, 1.5 and 2.25 diopter are obtainable.

7. The aid of claim 1, further including said power module comprising at least on battery.

8. The aid of claim 1, further including said lights comprising light emitting diodes.

9. The aid of claim 1, further including said plurality of first rack gears comprising first rack gears positioned singly proximate to upper corners and a first lower corner of said second frame.

10. The aid of claim 1, further including a control panel coupled to said first frame, said control panel being operationally coupled to said plurality of lights, said power module, and said second lens, wherein said control panel is positioned to couple said lights to said power module to illuminate the printed item, and wherein said control panel is positioned to adjust the position of said second lens relative to said first lens, such that said control panel is configured to adjust the magnification level to a level required by a user.

11. The aid of claim 10, further including said control panel being positioned proximate to a second lower corner of said first frame.

12. The aid of claim 10, further including said control panel comprising:
- a first knob rotationally coupled to said first frame, said first knob being operationally coupled to said plurality of lights and said power module, wherein said first knob is positioned to couple said lights to said power module to illuminate the printed item;
- a second knob rotationally coupled to said first frame, said second knob being operationally coupled to said second pinion gear; and
- wherein said second knob is positioned to rotate said second pinion gear such that said second rack gear is compelled to move said second lens relative to said first lens to adjust the magnification level to the level required by the user.

13. A reading aid comprising:
- a first frame, said first frame comprising an annular wall extending from a top to a bottom, said bottom being open, said first frame being substantially rectangularly shaped, said first frame being dimensioned at from twenty to thirty centimeter by ten to fifteen centimeters;
- a first lens positioned in said top;
- a second lens adjustably coupled to an interior of said annular wall, said second lens being parallel planarly positioned relative to said first lens, wherein said second lens is adjustably positionable relative to said first lens to obtain a magnification level required by a user, said second lens being adjustably positionable relative to said first lens such that magnification levels of zero to four diopter are obtainable in increments of 0.25 diopter, said second lens being adjustably positionable relative to said first lens such that magnification levels of one to three diopter are obtainable, said second lens being adjustably positionable relative to said first lens such that magnification levels of 1.25, 1.5 and 2.25 diopter are obtainable;
- a power module coupled to said first frame, said power module comprising at least on battery;
- a plurality of lights coupled to an upper end of said first frame, said lights being operationally coupled to said power module, said lights being oriented to illuminate a printed item positioned beneath said first frame, said lights comprising light emitting diodes;
- a second frame complementary to said first frame, such that said second frame is positionable through said bottom of said first frame, said second frame comprising an annular sidewall, said annular sidewall being coupled to and retaining said second lens,
- a plurality of first rack gears coupled to said annular sidewall of said second frame, each said first rack gear being gearedly coupled to a respective first pinion gear, said plurality of first rack gears comprising first rack gears positioned singly proximate to upper corners and a first lower corner of said second frame, each said first pinion gear being rotationally coupled to said interior of said annular wall, wherein said first rack gears are positioned on said annular sidewall such that said first rack gears are positioned to gearedly couple to said first pinion gears to stabilize said second frame and as said second frame is adjustably positioned relative to said first frame;
- a second rack gear coupled to said annular sidewall of said second frame, said second rack gear being gearedly coupled to a second pinion gear;
- a control panel coupled to said first frame, said control panel being operationally coupled to said plurality of lights, said power module, and said second lens, wherein said control panel is positioned to couple said lights to said power module to illuminate the printed item, and wherein said control panel is positioned to adjust the position of said second lens relative to said first lens, such that said control panel is configured to adjust the magnification level to a level required by a user, said control panel being positioned proximate to a second lower corner of said first frame, said control panel comprising a first knob and a second knob rotationally coupled to said first frame, said first knob being operationally coupled to said plurality of lights and said power module, wherein said first knob is positioned to couple said lights to said power module to illuminate the printed item, said second knob being operationally coupled to said second pinion gear, wherein said second knob is positioned to rotate said second pinion gear such that said second rack gear is compelled to move said second lens relative to said first lens to adjust the magnification level to the level required by the user;
- wherein said second lens is adjustably positionable relative to said first lens to obtain a magnification level required by a user, such that said lights are configured to illuminate a printed item positioned beneath said first frame such that the printed item is readable by the user.

* * * * *